United States Patent
Itou et al.

(10) Patent No.: US 6,744,357 B2
(45) Date of Patent: Jun. 1, 2004

(54) SIGNAL RECEIVER FOR TIRE AIR PRESSURE MONITORING SYSTEM

(75) Inventors: Shintarou Itou, Toyokawa (JP); Akihiro Taguchi, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/194,311

(22) Filed: Jul. 15, 2002

(65) Prior Publication Data

US 2003/0011472 A1 Jan. 16, 2003

(30) Foreign Application Priority Data

Jul. 16, 2001 (JP) .................................. 2001-215820

(51) Int. Cl.[7] .................. B60C 23/00; B60C 23/02; G08B 13/14; G08B 23/00
(52) U.S. Cl. .................. 340/445; 340/442; 340/447; 340/572.1; 340/693.3; 340/870.13; 370/11; 73/146.3; 73/146.5
(58) Field of Search .................. 340/442, 446, 340/445, 447, 448, 572.1, 10.1, 10.2, 10.3, 10.4, 10.33, 17.32, 7.38, 370.1, 870.13, 693.3, 10.34, 10.31, 10.32, 10.41; 73/146.3, 146.5; 370/11; 455/574

(56) References Cited

U.S. PATENT DOCUMENTS

| 6,239,690 B1 | * | 5/2001 | Burbidge et al. ........ 340/10.33 |
| 6,259,360 B1 | | 7/2001 | Takamura |
| 6,396,390 B1 | * | 5/2002 | Achhammer et al. ..... 340/10.33 |
| 6,430,484 B1 | * | 8/2002 | Takamura et al. ............ 701/29 |
| 6,448,892 B1 | * | 9/2002 | Delaporte .................... 340/442 |

FOREIGN PATENT DOCUMENTS

| JP | A-6-253366 | 9/1994 |
| JP | A-10-136463 | 5/1998 |
| JP | A-10-336760 | 12/1998 |
| JP | A-2000-132780 | 5/2000 |

\* cited by examiner

*Primary Examiner*—Jeffery Hofsass
*Assistant Examiner*—Lam Pham
(74) *Attorney, Agent, or Firm*—Posz & Bethards, PLC

(57) ABSTRACT

A signal receiver for tire air pressure monitoring system determines whether the pressure detection signals from all transmitters have been received during an engine stop state. Upon affirmative determination, the receiver sets a timer, and deactivates the entire or partial function of the receiver. The receiver determines whether the second predetermined period has expired after the setting of the timer. Until the period passes, the receiver retains the deactivated state thereby to save electric power consumption during engine stop state.

11 Claims, 5 Drawing Sheets

SIGNAL RECEIVER FOR TIRE AIR PRESSURE MONITORING SYSTEM

CROSS REFERENCE TO RELATED APPLICATION

This application is based on and incorporates herein by reference Japanese Patent Application No. 2001-215820 filed on Jul. 16, 2002.

FIELD OF THE INVENTION

The present invention relates to a signal receiver for tire air pressure monitoring system that intermittently receives tire pressure detection signals sent from signal transmitters of a tire air pressure monitoring system, and particularly to a signal receiver for tire air pressure monitoring system that is capable of reducing the power consumption during a vehicle engine stop state.

BACKGROUND OF THE INVENTION

A tire air pressure monitoring is proposed to detect air pressure of vehicle tires. This tire pressure monitoring system includes signal transmitters that detect the tire air pressure and transmit radio-wave tire pressure detection signals and a signal receiver that receives the tire pressure detection signals sent from the signal transmitters. The tire pressure monitor system needs to sense the tire air pressure even during the engine stop state so that it indicates the tire pressure to a vehicle driver before the vehicle starts to run. The signal transmitters and receiver are designed to operate intermittently to send and receive the pressure detection signals so that the power consumption during the engine stop state is reduced.

The proposed receiver, however, cannot have a long rest period due to the need of certain reception of the pressure detection signals sent from the transmitters. Specifically, the transmitters and receiver are not synchronous in their operations, and therefore the receiver has a shorter rest period relative to the transmitters thereby not to miss pressure detection signals.

SUMMARY OF THE INVENTION

It is therefore an object of the present invention to provide a signal receiver for a tire air pressure monitoring system capable of reducing the power consumption during the engine stop state.

In order to achieve the above objective, a signal receiver for a tire air pressure monitoring system receives an air pressure detection signal sent from a signal transmitter while turning on the power supply intermittently. The receiver includes an intermittent operation time control circuit that activates intermittently a partial or entire function of the receiver during a first predetermined period and deactivates the partial or entire function of the receiver during a second predetermined period that follows the first period. This intermittent operation time control circuit repeats the activation and deactivation alternately.

The partial receiver function is the function of a receiving section, or the functions of a control circuit section excluding the intermittent operation time control circuit and the receiving section. Alternatively, the intermittent operation time control circuit may be equipped in the outside of the receiver to control the entire receiver function.

The basis of deactivating the receiver function partially or entirely during the second predetermined period is that the tire air pressure generally varies less in a long duration of the engine stop state. In other words, during the parking of a vehicle, the necessity of updating tire pressure data in short time intervals decreases.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
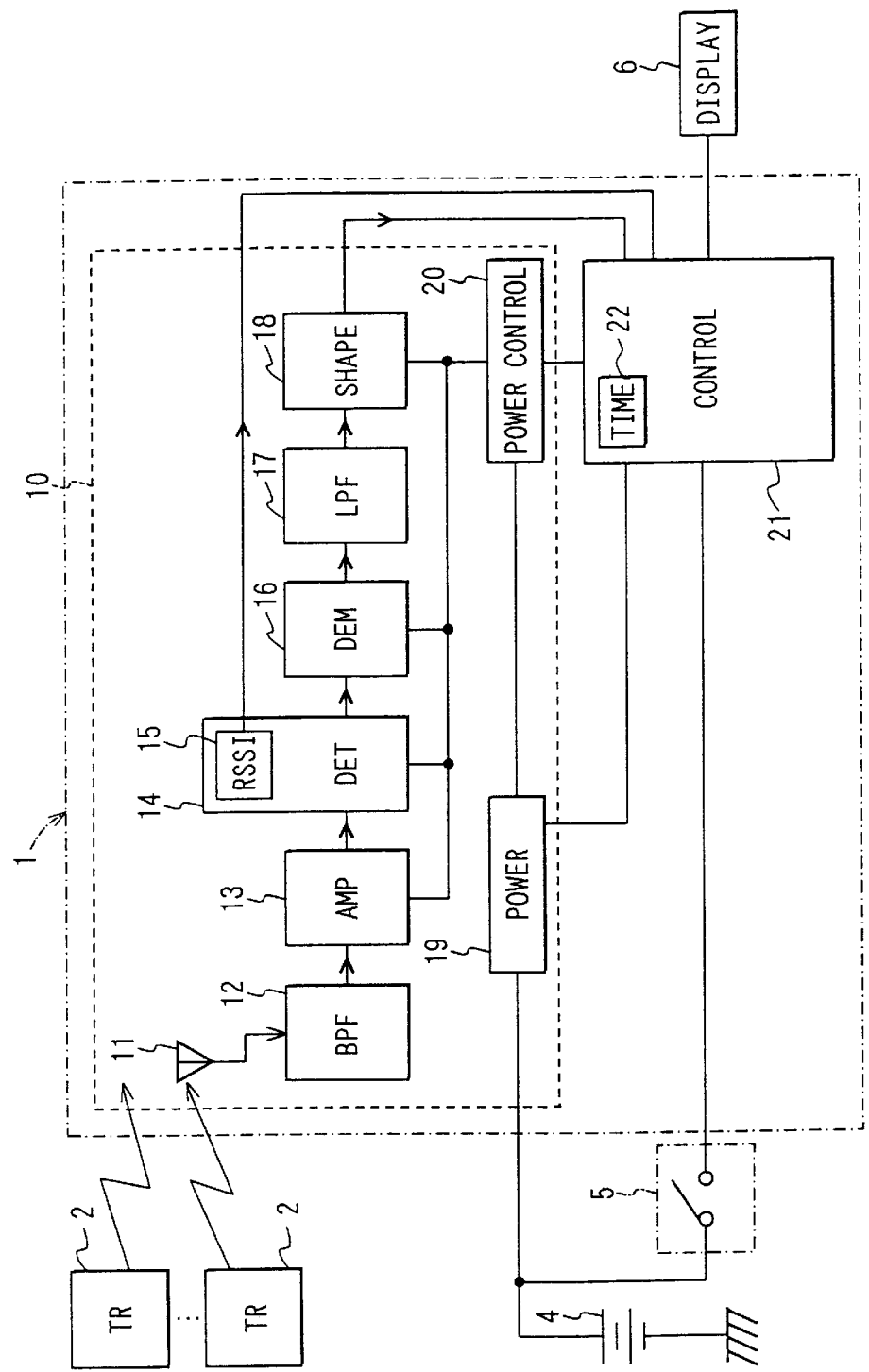
FIG. 1 is a block diagram showing a tire air pressure monitoring system having a signal receiver according to this invention, with a timer being equipped in the inside of the receiver.

Referring first to FIG. 1, a tire air pressure monitoring system includes a signal receiver 1 and signal transmitters 2. The transmitter 2 is provided for each tire and senses the tire air pressure, converts a resulting pressure signal into a frequency-modulated signal and transmits a resulting radio-wave signal. The signal receiver 1 receives the radio-wave pressure detection signal from the transmitter 2 and implements various signal processing. The system also includes a battery 4 that supplies electric power to the receiver 1, an ignition switch 5, and a display device 6 that displays the result of signal processing by the receiver 1 for the pressure detection signal.

The receiver 1 is made up of a receiving section 10 and a control circuit section 21. The receiving section 10 includes an antenna 11 that receives the pressure detection signal sent from the transmitter 2, a band pass filter (BPF) 12 that conducts the pressure detection signal of a certain frequency by filtering out noise components of other frequencies. The receiving section 10 further includes an amplifying circuit 13 that amplifies the filtered signal from the BPF 12, and a wave-detecting circuit 14 that converts the amplified frequency signal from the amplifying circuit 13 to a voltage signal. The receiving section 10 also includes a demodulation circuit 16 that demodulate the voltage signal into a rectangular-wave signal, a low pass is filter (LPF) 17 that filters out high-frequency noise components from the rectangular-wave signal, and a waveform shaping circuit 18 that shapes the waveform of the rectangular-wave signal. The detecting circuit 14 includes an RSSI circuit 15, that releases an RSSI voltage signal to the control circuit section 21.

The receiving section 10 further includes a power circuit 19 that converts the power voltage of the battery 4 into a voltage to be supplied to the control circuit section 21, and a power control circuit 20 that is a transistor switching circuit operating to feed or cut off the power voltage to the receiving section 10.

Figure 2:
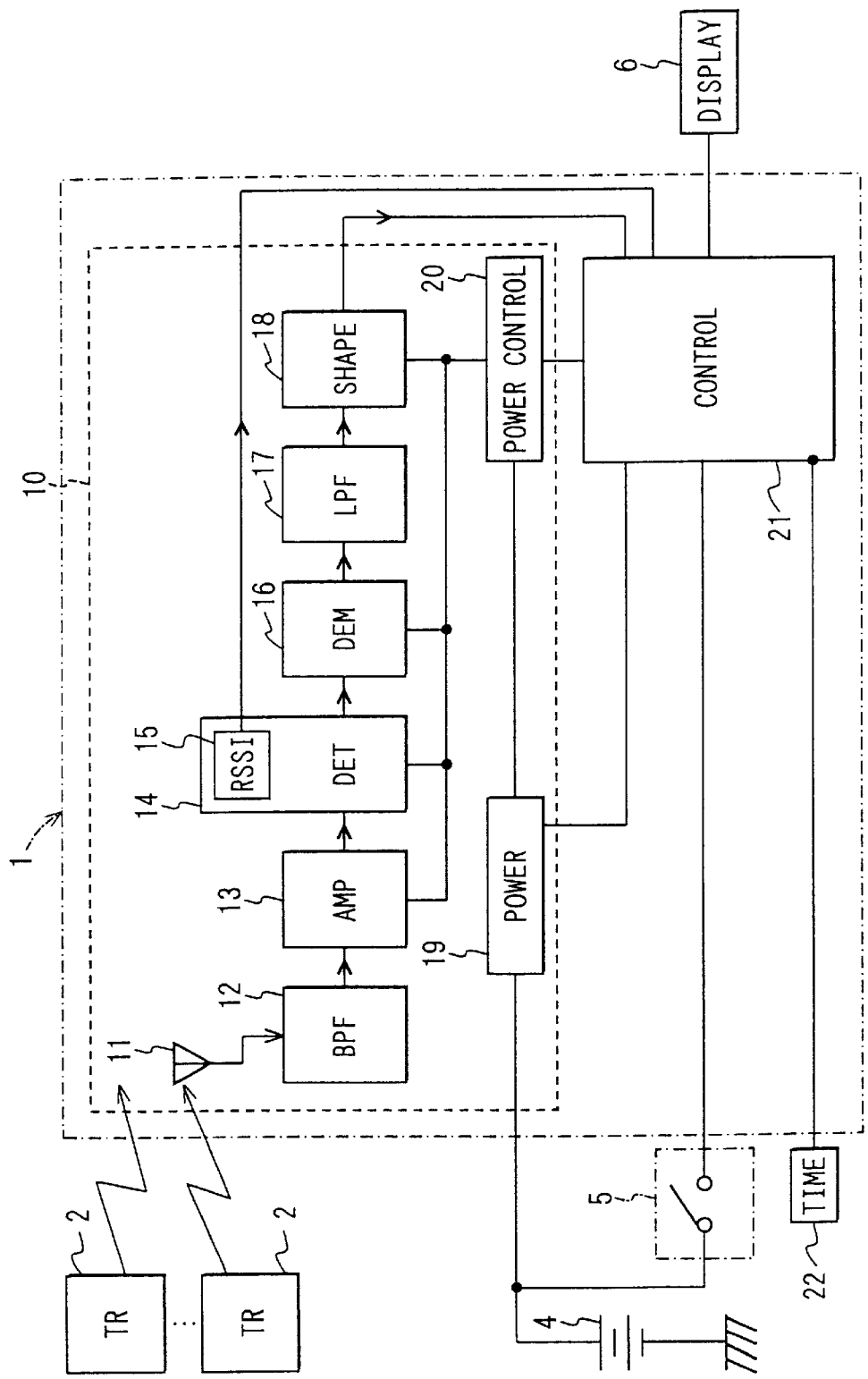
FIG. 2 is a block diagram showing a tire air pressure monitoring system having a signal receiver according to this invention, with a timer being equipped in the outside of the receiver.

The control circuit section 21 includes a timer 22 that times the operation of activating during a first period of cycle or deactivating during the second period the function of the receiver 1 partially or entirely. The partial function of the receiver 1 includes the functions of the receiving section 10 and portions (not shown) of the control circuit section 21 excluding the timer 22, or the function of only the receiving section 10. In the case of activating the entire function of the receiver 1 during the first period of cycle and deactivating during the second period, an external timer 22 is attached to the receiver 1 as shown in FIG. 2, thereby timing the operation of the receiving section 10 and control circuit section 21.

The control circuit section 21 functions to detect whether the ignition switch 5 is turned on or turned off, determine whether the RSSI signal released by the RSSI circuit 15 has a predetermined voltage level or higher, and display the result of control process for the pressure detection signal on the display device 6. The timer 22 performs an intermittent operation time control.

Figure 3:
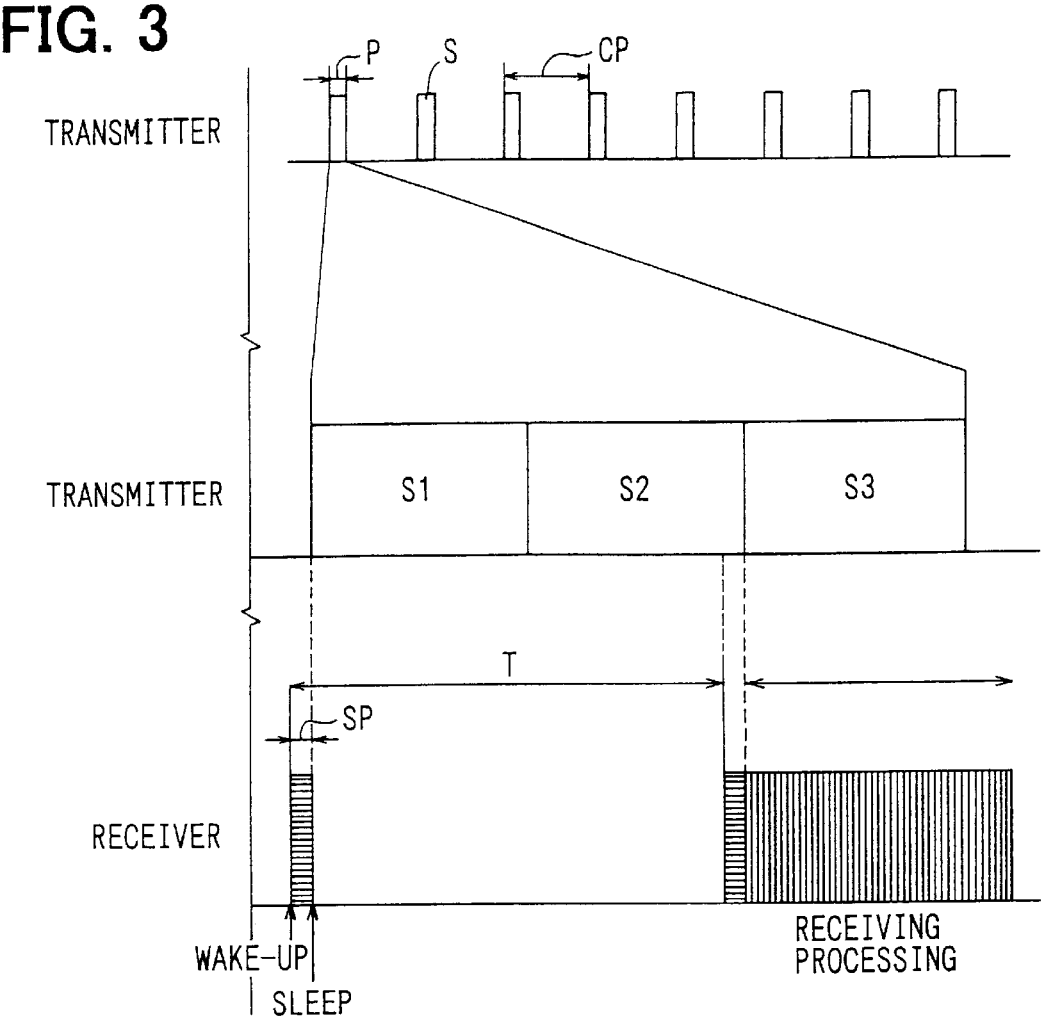
FIG. 3 is a timing chart showing the intermittent operation of the signal transmitter, content data in the pressure detection signal during the data sending period of the transmitter, and the intermittent operation of the signal receiver.

Next, the timing of reception by the receiver 1 of the pressure detection signal that is sent from the transmitter 2 will be explained with reference to the timing chart of FIG. 3. The transmitter 2 senses the tire air pressure, and sends the pressure detection signal to the receiver 1. The transmitter 2 sends the pressure detection signal S during a transmission period P at every certain interval (cycle period CP). The pressure detection signal is the succession of three pieces of same pressure data S1 to S3.

The receiver 1 wakes up to enter the stable period SP periodically, and it receives the pressure detection signal if the signal is sent from the transmitter 2 during the stable period SP. If, otherwise, the pressure detection signal is not sent during the stable period SP, it sleeps on expiration of the stable period SP. The receiver 1 operates intermittently at an operation interval T that is shorter (specifically $2/3$ or less) than the signal transmission period P so that it can receive at least one of the three successive pressure data S1 to S3 from the transmitter 2, that is asynchronous in operation with the receiver 1. If the receiver 1 has the operation interval T longer than the $2/3$ of signal transmission period P, it would fail to receive the any pressure data. For example, if the operation interval T is larger than the $2/3$ of the signal transmission period P, the function of the receiver 1 sleeps partially or entirely before the detection signal is sent from the transmitter 2, the receiver 1 might wake up during the period of the third pressure data S3. Accordingly, the receiver 1 wakes up during the period of one of three successive pressure data and receives the following pressure data.

Figure 4:
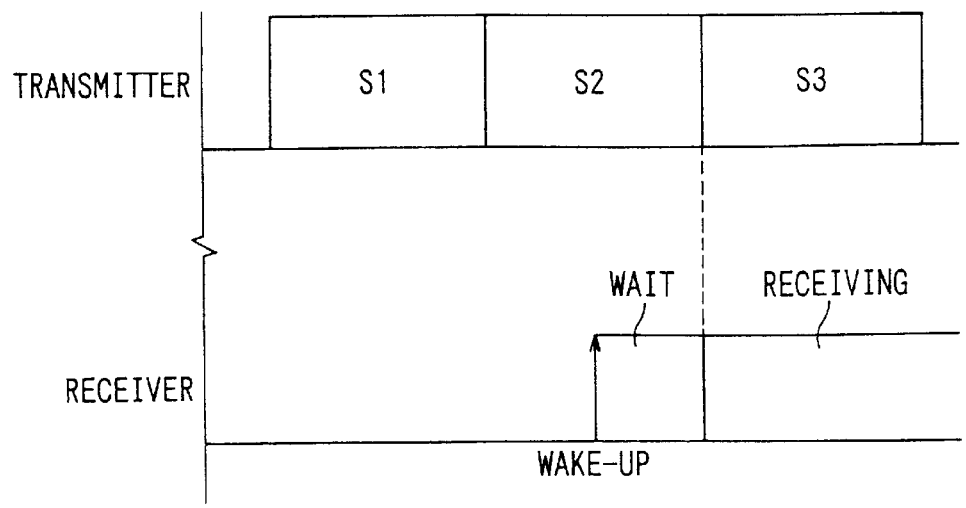
FIG. 4 is a timing chart showing timing of reception by the receiver of the pressure detection signal sent from the transmitter.

Specifically, for example, when the receiver 1 wakes up during the period of the second pressure data S2 as shown in FIG. 4, it stays in the wait state during the rest of the period and receives the third pressure data S3. If, otherwise, the receiver 1 has the operation interval T longer than $2/3$ of signal transmission period, it might wake up during the period of the third pressure data S3 and would fail to receive any pressure data. Therefore, the operation interval T of the receiver 1 is set to be $2/3$ or less of signal transmission period P.

Figure 5:
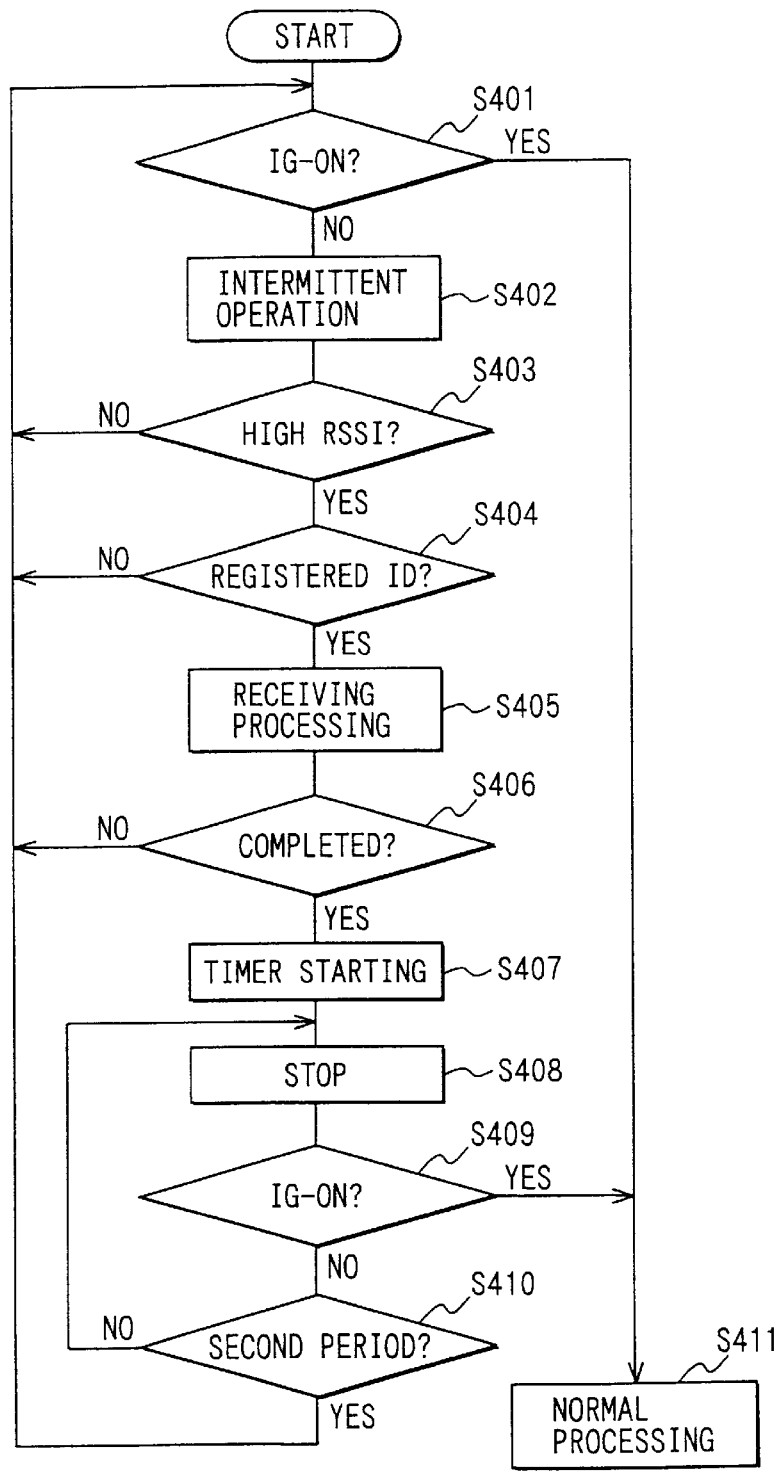
FIG. 5 is a flowchart showing the operation of a control circuit shown in FIGS. 1 and 2.

Next, the operation of the control circuit section 21 of the receiver 1 will be explained with reference to the flowchart of FIG. 5.

The first step S401 detects whether the ignition switch (IG) 5 is on or off. On finding the on-state of the ignition switch 5, the sequence proceeds to step S411 to perform the usual continuous operation instead of operating intermittently. If, otherwise, the ignition switch 5 is found to be off, the sequence proceeds to step S402 to perform the intermittent operation shown in FIG. 3.

The next step S403 determines whether the RSSI signal released by the RSSI circuit 15 has the predetermined voltage level or higher thereby to reject noise components included in the pressure detection signal received by the antenna 11. On finding the RSSI voltage level to be high enough, the sequence proceeds to step S404 to determine whether the ID number included in the pressure detection signal coincides with the registered ID number of the receiver 1 thereby to reject pressure detection signals transmitted by other vehicles. On finding the matching of ID number, the sequence proceeds to step S405 to perform the pressure data receiving processing. This processing includes, for example, the extraction of tire air pressure data from the pressure detection signal, recording of the data in a memory (not shown) and display of: the data on the display device 6.

If, otherwise, the RSSI voltage is found below the predetermined level at step S403 or the ID number is found to be different from the registered one at step S404, the sequence returns to step S401 and repeats the foregoing operations.

The subsequent step S406 determines whether the pressure detection signals S from all transmitters 2, e.g., four transmitters attached on four wheels of vehicle or two transmitters attached on two wheels of motorcycle, have been received. The time length from the beginning of intermittent operation until the reception of all pressure detection signals is the first predetermined period T1. The first period may include a certain delay time. If the determination step S406 negates the reception of all pressure detection signals S, the sequence returns to step S401 and repeats the foregoing operations. On finding the reception of all pressure detection signals S, the sequence proceeds to step S407 to start the timer 22, and next proceeds to step S408 to stop the function of the receiver 1 partially or entirely.

The next step S409 determines whether the ignition switch (IG) 5 is on or off. On finding the IG switch 5 to be on, the sequence proceeds to step S411 to perform the usual operation as mentioned above. If, otherwise, the IC switch 5 is found to be off, the sequence proceeds to step S410 to determine whether the second predetermined period has expired after the starting of the timer 22. Unless the expiration of second period is found, the sequence returns to step S408 to retain the deactivated state. On finding the expiration of second period, the sequence returns to step S401 and repeats the foregoing operations.

According to this embodiment, the receiver 1 has its partial or entire function activated intermittently by means of the timer 22 during at least the first predetermined period and, upon receiving the pressure detection signals from all transmitters (e.g., four transmitters of a 4-wheel vehicle), has its partial or entire function deactivated during the second predetermined period.

Figure 6:
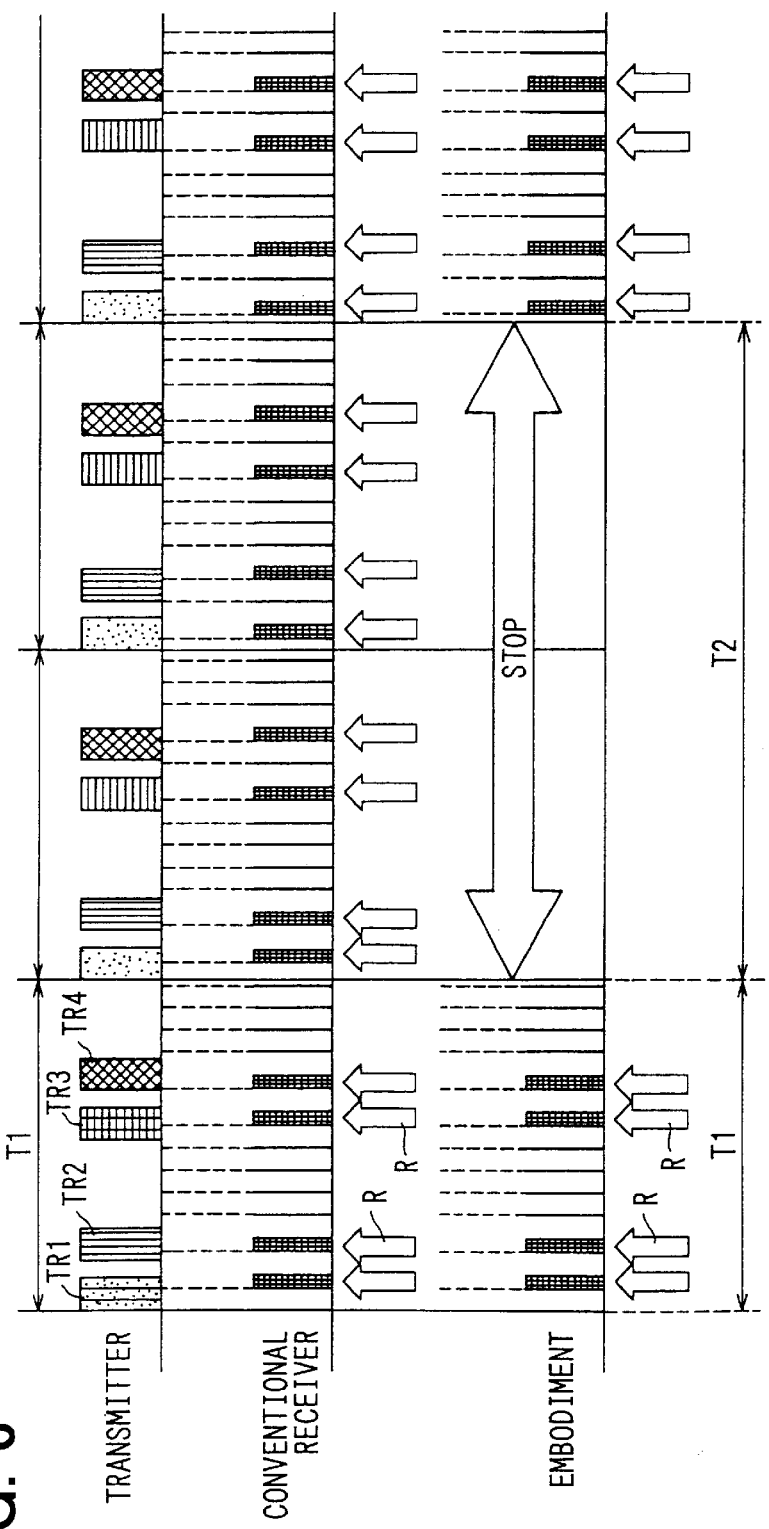
FIG. 6 is a timing chart showing the pressure detection signals sent from all transmitters, timing of reception of the signals by the conventional signal receiver, and timing of reception of the signals by the signal receiver.

The conventional signal receiver operates to receive the pressure detection signals repeatedly even after the reception of pressure detection signals from all transmitters as shown by R in FIG. 6. However, the tire air pressure is less likely to vary in a long duration of the engine stop state, e.g., during the parking of vehicle, in that period it is less needed to sense the tire air pressure repeatedly to update the tire pressure data. Therefore, the function of the receiver 1 can be deactivated partially or entirely during the second predetermined period T2 upon receiving the pressure detection signals from all transmitters, thereby reducing the power consumption during the engine stop state. The second period T2 is preferably equal to or more than the first period T1.

Although in the foregoing embodiment, the intermittent operation time control is performed by the timer 22, an alternative arrangement is the provision of a timer 22 with a sole time count function and the provision of a control circuit section 21 with an additional function of controlling the intermittent operation time.

Although the foregoing embodiment is designed to treat pressure detection signals sent from a plurality of transmitters 2, the number of transmitters is not limited.

Figure 7:
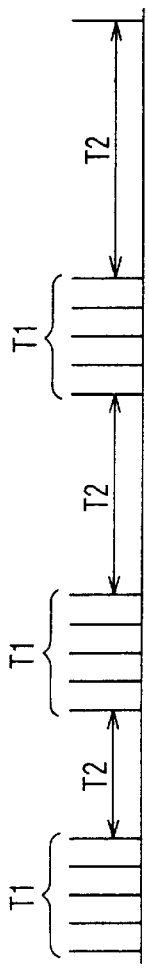
FIG. 7 is a timing diagram showing the operation of a signal receiver according to a modification of the embodiment.

As a modified embodiment, the second period T2 may be extended progressively with time as shown in FIG. 7 so that the power consumption can further be reduced in the engine stop state. Since the tire air pressure usually does not vary so much in a short time in the engine stop state compared with the running state, in that period it is less needed to update tire pressure data at a short time interval, the deactivation period may be extended progressively with time.

What is claimed is:

1. A signal receiver for a tire air pressure monitoring system comprising:
    a receiving section that receives tire pressure detection signals from transmitters provided for all tires of a vehicle when activated; and
    an intermittent time control section that activates intermittently a partial or entire function of the signal receiver during a first predetermined period and deactivates the partial or entire function of the signal receiver during a second predetermined period that follows the first predetermined period, the intermittent time control section cyclically repeating activation and deactivation of the partial or entire function of the signal receiver, wherein
        the first predetermined period is set to enable the receiving section to respectively receive the tire pressure detection signals from all of the transmitters, and
        the intermittent time control section switches from an intermittent active state in the first predetermined period to a deactivated state in the second predetermined period upon receiving the tire pressure detection signals from all of the transmitters.

2. The signal receiver according to claim 1, wherein the intermittent time control section extends the second predetermined period progressively.

3. The signal receiver according to claim 1, further comprising a control circuit section that includes at least the intermittent time control section, and the partial function of the signal receiver includes the function of the receiving section and a function of the control circuit section excluding the intermittent time control section.

4. A signal receiver for a tire air pressure monitoring system comprising:
    a receiving section for receiving tire pressure detection signals from transmitters provided for all tires of a vehicle when activated; and
    an intermittent time control section for intermittently activating one of partial operation and full operation of the signal receiver during a first time period and deactivating one of the partial operation and the full operation of the signal receiver section during a second time period, the first and second time periods being different from one another, the intermittent time control section cyclically repeating activation and deactivation of the partial and full operation of the signal receiver, wherein
        the first time period is set to enable the receiving section to respectively receive the tire pressure detection signals from all of the transmitters, and
        the intermittent time control section changes from an intermittent active state in the first time period to a deactivated state in the second time period upon receiving the tire pressure detection signals from all of the transmitters.

5. The signal receiver according to claim 4, further comprising a control circuit section that includes at least the intermittent time control section.

6. The signal receiver according to claim 4, wherein the partial receiver operation of the signal receiver includes the receiving section and the control circuit section excluding the intermittent time control section.

7. The signal receiver according to claim 4, wherein the intermittent time control section extends the second time period progressively.

8. The signal receiver according to claim 4, wherein an operation interval of the receiving section is $\frac{2}{3}$ or less of a signal transmission period.

9. The signal receiver according to claim 4, wherein the second time period is at least substantially the same as the first time period.

10. The signal receiver according to claim 4, wherein the intermittent time control section further comprises a timer for timing activation of the partial and full operation of the receiving section during the first time period and deactivation during the second time period.

11. The signal receiver according to claim 10, wherein the timer is externally attached to the receiving section.

* * * * *